US008013832B2

(12) United States Patent
Chai et al.

(10) Patent No.: US 8,013,832 B2
(45) Date of Patent: Sep. 6, 2011

(54) LIQUID CRYSTAL DISPLAY

(75) Inventors: Chong-chul Chai, Seoul (KR); Cheol-woo Park, Suwon-si (KR); Kyoung-ju Shin, Hwaseong-si (KR); Joon-hak Oh, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/893,228

(22) Filed: Sep. 29, 2010

(65) Prior Publication Data

US 2011/0018910 A1 Jan. 27, 2011

Related U.S. Application Data

(62) Division of application No. 11/473,714, filed on Jun. 23, 2006, now abandoned.

(30) Foreign Application Priority Data

Aug. 4, 2005 (KR) ........................ 10-2005-0071332

(51) Int. Cl.
*G09G 3/36* (2006.01)
*G02F 1/136* (2006.01)

(52) U.S. Cl. ............. 345/103; 345/92; 345/204; 349/44

(58) Field of Classification Search .................... 345/87, 345/88, 92, 94–96, 102, 103, 208–210, 204; 349/41–42, 44, 139, 141, 89–70
See application file for complete search history.

(56) References Cited

U.S. PATENT DOCUMENTS

| | | | | |
|---|---|---|---|---|
| 5,164,851 | A * | 11/1992 | Kanemori et al. | 349/55 |
| 5,253,091 | A | 10/1993 | Kimura et al. | |
| 5,543,947 | A | 8/1996 | Mase et al. | |
| 6,014,190 | A | 1/2000 | Kim et al. | |
| 6,111,627 | A | 8/2000 | Kim et al. | |
| 6,259,504 | B1 | 7/2001 | Shin et al. | |
| 6,266,109 | B1 | 7/2001 | Yamaguchi et al. | |
| 6,583,777 | B2 | 6/2003 | Hebiguchi et al. | |
| 6,809,719 | B2 * | 10/2004 | Wu et al. | 345/103 |
| 2002/0149598 | A1 | 10/2002 | Greier et al. | |
| 2002/0180901 | A1 * | 12/2002 | Kim | 349/43 |
| 2003/0132903 | A1 | 7/2003 | Ueda | |
| 2004/0140972 | A1 * | 7/2004 | Hirota et al. | 345/204 |

FOREIGN PATENT DOCUMENTS

| | | |
|---|---|---|
| CN | 1242855 | 1/2000 |
| CN | 1434432 | 8/2003 |
| CN | 1482505 | 3/2004 |

(Continued)

OTHER PUBLICATIONS

Chinese Office Action for application No. 2006101015993 dated Oct. 19, 2007 with English Translation.

*Primary Examiner* — Lun-Yi Lao
*Assistant Examiner* — Jarurat Suteerawongsa
(74) *Attorney, Agent, or Firm* — Cantor Colburn LLP

(57) ABSTRACT

A display apparatus includes a plurality of pixels arranged in a matrix array; a plurality of gate lines applying a same gate signal to at least two rows of the pixels; a plurality of data lines crossing the gate lines; a TFT disposed at an intersection of each gate line and each data line; and a light source part sequentially providing at least two colors of light to each pixel every frame, thus enhancing a charging rate of each.

29 Claims, 9 Drawing Sheets

FOREIGN PATENT DOCUMENTS

| | | |
|---|---|---|
| CN | 1536415 | 10/2004 |
| EP | 0940796 | 9/1999 |
| JP | 06118909 | 4/1994 |
| JP | 08095526 | 4/1996 |
| JP | 11101967 | 4/1999 |
| JP | 2001350454 | 12/2001 |
| JP | 2002023135 | 1/2002 |
| JP | 2003005214 | 1/2003 |
| JP | 2003108102 | 4/2003 |
| JP | 2003330037 | 11/2003 |
| JP | 2006098613 | 4/2006 |

* cited by examiner

LIQUID CRYSTAL DISPLAY

This application is a divisional of U.S. application Ser. No. 11/473,714, filed on Jun. 23, 2006, which claims priority to Korean Patent Application No. 2005-0071332, filed on Aug. 4, 2005 and all the benefits accruing therefrom under 35 U.S.C. §119, and the contents of which in its entirety are herein incorporated by reference.

BACKGROUND OF THE INVENTION

1. Field of the Invention

The present invention relates to a liquid crystal display ("LCD"), and more particularly, to a liquid crystal display, which is driven by a field sequential color ("FSC") method or a color sequential display ("CSD") method.

2. Description of the Related Art

An LCD comprises an LCD panel comprising a thin film transistor ("TFT") substrate on which TFTs are formed, a color filter substrate on which color filters are formed, and a liquid crystal layer interposed between both substrates.

Generally, a conventional LCD comprises a color filter layer composed of three colors such as red ("R"), green ("G") and blue ("B"), and may also be primary colors. The color filter layer controls the transmittance of light passing through the color filter layer, thereby displaying a required color.

Recently, an LCD has been created using an FSC method. The FSC method illuminates independent R, G and B light sources sequentially and periodically, and transmits a color signal corresponding to each pixel with a synchronization with the lighting period, thereby producing a full color image. This FSC method has advantages of enhancing an aperture ratio and a yield since a pixel is not divided into subpixels and reducing the number of driving circuits, which is needed for each subpixel, by one-third.

In this FSC method, the three light sources are sequentially illuminated to form one frame. Therefore, the FSC method requires a frequency three times higher than that of the conventional driving method. With the FSC method, the term frequency means how many times the frames are refreshed in one second. As the display apparatuses become larger, the number of gate lines increases, yet a gate on time decreases. The gate on time represents how long a gate on voltage is applied to one gate line. Therefore, the gate on time is the reciprocal of the product of the frequency and the number of the gate lines. As the gate on time decreases, a data signal is not sufficiently applied to the pixel. This causes a charging rate within the pixel electrode to decrease and quality of the display apparatus to deteriorate. Further, the area of a pixel charged by one TFT increases since one pixel is not divided into three subpixels, thereby reducing the charging rate.

Accordingly, methods have been discussed including using low-resistance wire, increasing an area of the TFT or making a thickness of a gate insulating layer thinner in order to prevent reduction of the charging rate, yet a need for enhancement of the charging rate still remains.

BRIEF SUMMARY OF THE INVENTION

Accordingly, it is an aspect of the present invention to provide an LCD of which charging rate of a pixel is enhanced.

The foregoing and/or other aspects of the present invention are achieved by an exemplary embodiment of a display apparatus including: a plurality of pixels arranged in a matrix array; a plurality of gate lines applying a same gate signal to at least two rows of pixels; a data line crossing the gate lines; a TFT disposed at an intersection of one of the gate lines and the data line; and a light source part sequentially providing at least two colors of light to the pixel every frame.

According to an exemplary embodiment of the present invention, the plurality of gate lines applying the same gate signal to the pixels are connected to one another.

According to an exemplary embodiment of the present invention, three rows of the pixels are applied with the same gate signal.

According to an exemplary embodiment of the present invention, a plurality of data lines are provided in one pixel.

According to an exemplary embodiment of the present invention, the number of the data lines in one pixel is the number of the pixels applied with the same gate signal.

According to an exemplary embodiment of the present invention, at least one of the adjacent pixels in a column direction applied with the same gate signal is connected to a different data line from the others.

According to an exemplary embodiment of the present invention, the adjacent pixels in a column direction applied with the same gate signal are connected to different data lines from one another.

According to an exemplary embodiment of the present invention, at least a portion of each the pixels comprises a plurality of TFTs.

According to an exemplary embodiment of the present invention, the TFTs are connected to the same data lines.

According to an exemplary embodiment of the present invention, the TFT is provided in two.

According to an exemplary embodiment of the present invention, the TFTs are disposed symmetrically across each data line.

According to an exemplary embodiment of the present invention, each of the pixels comprises a pixel electrode and the data line passes through the pixel.

According to an exemplary embodiment of the present invention, the data line partially overlaps the pixel electrode.

According to an exemplary embodiment of the present invention, the data line connected to one pixel does not overlap the pixel electrode.

According to an exemplary embodiment of the present invention, the pixel further comprises at least one or more bridge electrodes, the bridge electrodes connect the pixel electrodes, which are separated from each other across the data line.

According to an exemplary embodiment of the present invention, the pixel comprises a pixel electrode and the gate line passes through the pixel.

According to an exemplary embodiment of the present invention, the pixel comprises four TFTs.

According to an exemplary embodiment of the present invention, the TFTs are disposed symmetrically across one of the gate lines and the data line.

According to an exemplary embodiment of the present invention, one of the gates line partly overlaps the pixel electrode.

According to an exemplary embodiment of the present invention, one of the gate lines does not overlap the pixel electrode.

According to an exemplary embodiment of the present invention, each of the pixels further comprises at least one or more bridge electrodes to connect the pixel electrodes, which are separated from each other across the gate line.

According to an exemplary embodiment of the present invention, the display apparatus further comprises an organic layer formed between the data line and the pixel.

According to an exemplary embodiment of the present invention, the light is three-color light and the three colors comprise red, green and blue.

According to an exemplary embodiment of the present invention, a first data line, a second data line and a third data line are sequentially provided in one pixel in a row direction, and the adjacent pixels in a column direction are sequentially connected to the first, the second and the third data lines.

According to an exemplary embodiment of the present invention, the display apparatus further comprises a data driver applying a data signal to the data line and a controller controlling the data driver, wherein the controller controls the data driver so that different polarities of the data signals are applied to the adjacent data lines in a row direction.

According to an exemplary embodiment of the present invention, a first data line, a second data line and a third data line are sequentially provided in one pixel in a row direction, and the adjacent pixels in a column direction are sequentially connected to the first, the third and the second data lines.

According to an exemplary embodiment of the present invention, the display apparatus further comprises a data driver applying a data signal to the data line and a controller controlling the data driver, wherein the controller controls the data driver so that different polarities of the data signals are applied to the adjacent data lines in a row direction.

BRIEF DESCRIPTION OF THE DRAWINGS

The above and/or other aspects and advantages of the present invention will become apparent and more readily appreciated from the following detailed description of the invention, taken in conjunction with the accompanying drawings of which.

DETAILED DESCRIPTION OF THE INVENTION

Figure 1:
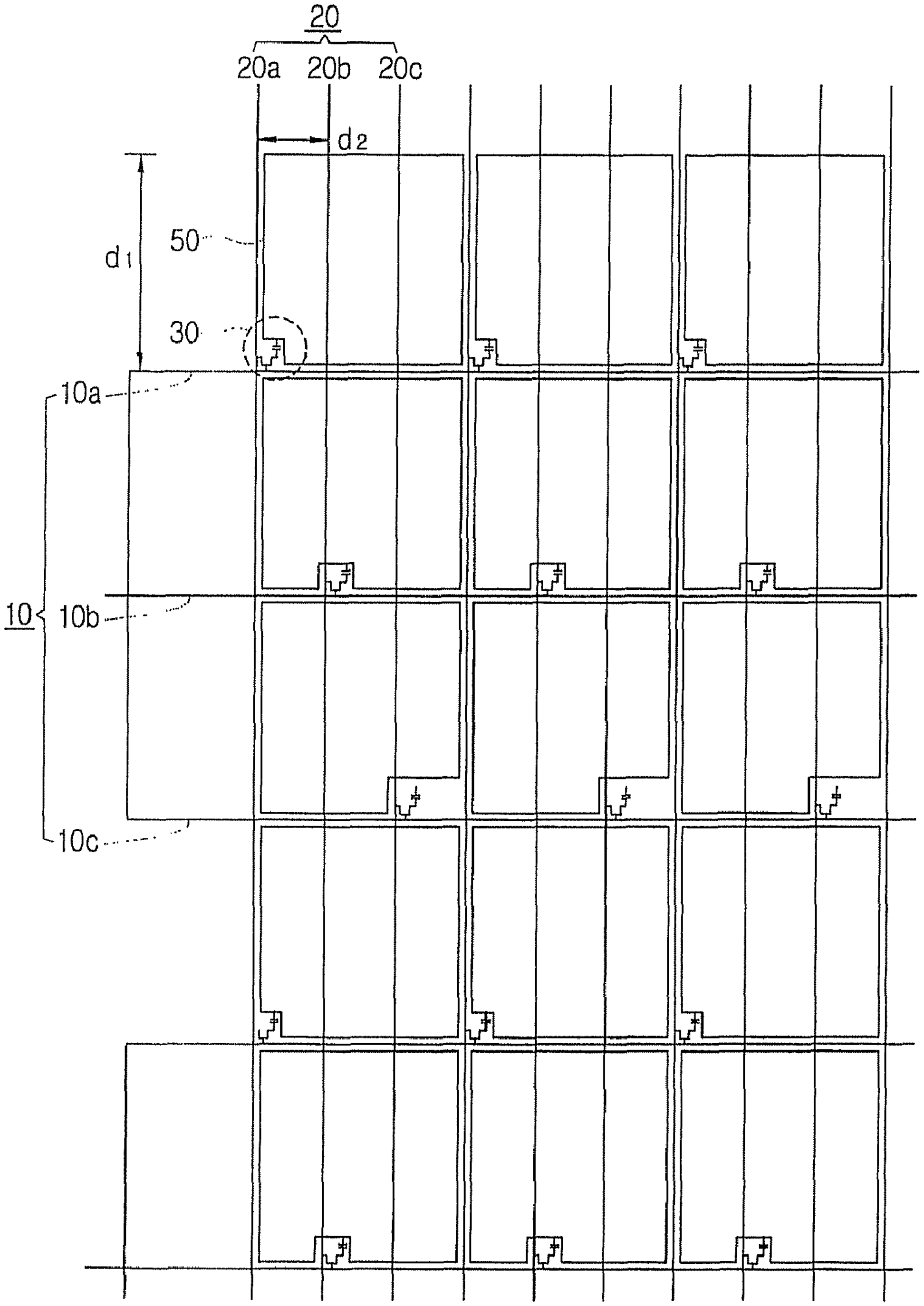
FIG. 1 is a plan view of a first exemplary embodiment of an LCD showing an arrangement of a plurality of pixels according to the present invention.

The exemplary embodiments of the present invention will now be described with reference to the attached drawings. The present invention may, however, be embodied in different forms and thus the present invention should not be construed as being limited to the exemplary embodiments set forth herein. Rather, these exemplary embodiments are provided so that this disclosure will be thorough and complete, and will fully convey the scope of the invention to those skilled in the art.

In the drawings, the thickness of the layers, films, and regions are exaggerated for clarity. When an element such as a layer, film, region, or substrate is referred to as being "on" another element, it can be directly on the other element or intervening elements may also be present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following exemplary embodiments of the present invention, a display apparatus will be described with an LCD as an example, but it is not limited to an LCD. Other display apparatuses incorporated into the LCDs of the exemplary embodiments described herein would also be within the scope of these exemplary embodiments.

As shown in FIG. 1, an LCD comprises a plurality of data lines 20, a gate line 10 crossing the data line 20 to form a pixel 50 arranged in a matrix array and a TFT 30 disposed at an intersection of the gate line 10 and the data line 20. Also, the LCD further comprises a gate driver and a data driver (both not shown), which are driving parts to apply a control signal and an image signal to the gate line 10 and the data line 20, respectively.

The pixel 50 is arranged in a matrix array and formed of a pixel electrode such as indium tin oxide (ITO), for example, in the exemplary embodiment. Namely, the pixel 50 is one square which is formed by one gate line 10 and three data lines 20*a*, 20*b*, 20*c*, i.e., a dot to display one color. The pixel electrode is a transparent electrode forming the pixel 50.

Three gate lines 10*a*, 10*b*, 10*c* are connected with one another at their ends. Therefore, a single gate signal supplied by the gate driver is applied to the three gate lines 10*a*, 10*b*, 10*c* at the same time. With this configuration, three rows of pixels, as illustrated in FIG. 1, are driven for one gate on time.

In a conventional LCD, the gate signal supplied by a gate driver is applied to only one gate line at a time, thereby driving only one row of pixels. Unlike the conventional driving method, in an FSC driving method, red, green and blue lights are sequentially radiated for forming one frame. In other words, the number of the gate signals has to be at least three times as much as a frequency recognized by a user to form one frame in the FSC driving. For example, the actual frequency for the FSC driving method has to be higher than 180 Hz so that the user considers the image to be 60 Hz. Accordingly, the gate on time for a display apparatus having a 1280*1024 resolution and an apparent frequency of 60 Hz equals 1/(the apparent frequency*the number of the gate lines*3), i.e. 1/(60*1024*3)=5.425 μs.

However, when a gate signal is applied simultaneously to the three gate lines 10*a*, 10*b*, 10*c* connected with one another, the gate on time becomes 16.275 μs, which is three times as long as the conventional gate on time. As the gate on time increases, a time for charging data signals in the pixel 50 is also prolonged, thereby improving a charging rate in the pixel. Further, since passages connecting the gate drivers and the gate lines 10 are decreased by one-third, the number of the gate pads and the gate drivers is also decreased by one-third.

Although three gate lines 10 are connected at their ends in the exemplary embodiment, four gate lines or more may be connected with one another. Since the display apparatus adopting an impulsive driving method, producing a black image between the frames, should be driven twice as fast as the conventional display apparatus, the impulsive driving display apparatus can also employ the above configuration of the present invention that applies one gate signal simultaneously to the multiple gate lines.

The data line 20 crosses the gate line 10 to form the pixel 50 arranged in the matrix array. The data line 20 comprises three data lines 20*a*, 20*b*, 20*c* which are connected to each pixel 50 supplied with the same gate signal. One pixel 50 is a square shape of which a side is d1 in length. Two data lines 20*b*, 20*c* are arranged at a one-third position of the d1 and at a two-thirds position of the d1, respectively, while passing through the pixels 50. One data line 20*a* is disposed outside one side of the pixel 50. Accordingly, one side of the pixel 50 is divided by the three data lines 20*a*, 20*b*, 20*c* into three portions of which each portion is d2 in length.

The adjacent pixels 50 in the column direction are connected with the three data lines 20*a*, 20*b*, 20*c*, one by one. Since the same gate signal is applied to three rows of the pixels 50, the above arrangement for the data lines 20*a*, 20*b*, 20*c* is required to apply different data signals to the adjacent pixels 50 in a column direction. The TFTs arranged at intersections of the three gate lines 10*a*, 10*b*, 10*c* and the three data lines 20*a*, 20*b*, 20*c* are connected with the pixels 50 one by one so that the same data signals are not applied to the adjacent pixels 50 in a column direction. A data signal delivered from the first data line 20*a* is applied to a first row, first column pixel 50 driven by the first gate line 10*a*, a data signal delivered from the second data line 20*b* is applied to a second row, second column pixel 50 driven by the second gate line 10*b*, and the a data signal delivered from the third data line 20*c* is applied to a third row, third column pixel 50 driven by the third gate line 10*c*. Accordingly, different data signals are applied to each of the pixels 50.

The number of the data lines 20 disposed in one pixel 50 corresponds to the number of rows of pixels 50 where the same gate signal is applied, i.e., the number of the gate lines connected with one another at their ends. Therefore, the number of the gate lines 10 connected with one another is proportional to the number of the data lines 20 disposed in one pixel 50. As described before, more than three gate lines 10 may be connected with one another, therefore more than three data lines 20 may be disposed in one pixel 50. Since color filters are not used in the FSC driving method, one pixel 50 is three times larger than that of the conventional LCD. Accordingly, disposing three data lines 20 in one pixel 50 does not make a big difference in an aperture ratio.

The TFT 30 delivers the gate signal supplied from the gate line 10 and the data signal supplied from the data line 20 to the pixel 50. As shown in FIG. 1, the adjacent TFTs 30 arranged in a column direction are connected to different data lines 20*a*, 20*b*, 20*c*. Such an arrangement of the TFTs 30 allows the adjacent pixels 50 arranged in a column direction to be connected to different data lines 20*a*, 20*b*, 20*c*, respectively. Accordingly, the adjacent pixels 50 arranged in a column direction are supplied with different data signals.

Generally, an inorganic passivation layer (not shown) is disposed between the data line 20 and the pixel 50, e.g., between a data metal layer comprising the data line 20 and the pixel electrode comprising the pixel 50. When metal layers are deposited in succession, a predetermined capacitance may be generated between the metal layers. This causes cross-talk such that data signals interfere with each other, which increases when a plurality of data lines 20 are disposed in one pixel 50. Accordingly, an organic layer may further be disposed between the data line and the pixel 50 in addition to the inorganic passivation layer.

Figure 2:
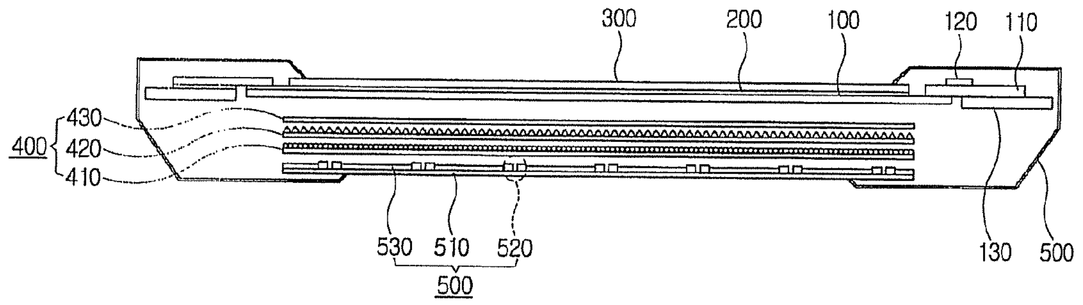
FIG. 2 is a cross-sectional view of the first exemplary embodiment of the LCD of FIG. 1 according to the present invention.

Referring to FIG. 2, the LCD comprises an LCD panel comprising a first substrate 100, a second substrate 200 and a liquid crystal layer 300 interposed between both substrates 100, 200, a light source part 500 disposed in the rear of the LCD panel to provide light to the LCD panel, a light control member 400, and a chassis 600 supporting and accommodating the LCD panel and the light source part 500.

The LCD panel comprises the first substrate 100 on which the pixel 50 and the TFT 30 are formed, the second substrate 200 facing the first substrate 100 and comprising a black matrix, a white filter and a common electrode, a sealant adhering both substrates 100, 200 to form a cell gap, and the liquid crystal layer 300 disposed between both substrates 100, 200 and the sealant. The LCD panel adjusts an arrangement of the liquid crystal layer 300 to form an image. However, the LCD panel does not emit light by itself, therefore a light source such as a light emitting diode (LED) 520 is provided in the rear of the LCD panel to provide light. A driving part is disposed in one side of the first substrate 100 to apply a driving signal. The driving part comprises a flexible printed circuit ("FPC") 110, a driving chip 120 mounted on the FPC 110 and a printed circuit board ("PCB") 130 connected to one side of the FPC 110. The driving part shown in FIG. 2 is a chip on film ("COF") type. However, any well-known type, such as a tape carrier package ("TCP"), chip on glass ("COG"), or the like, is available as the driving part. Also, the driving part may be formed on the first substrate 100 while lines 10 and 20 are formed.

The light control member 400 disposed in the rear of the LCD panel comprises a diffusion plate 410, a prism film 420 and a protection film 430.

The diffusion plate 410 comprises a base plate and a coating layer having beads formed on the base plate. The diffusion plate 410 diffuses light provided from the LED 520, thereby improving the uniformity of the brightness.

Triangular prisms are formed on the prism film 420 at a predetermined alignment. The prism film 420 concentrates the light diffused from the diffusion plate 410 in a direction perpendicular to a surface of the LCD panel. Typically, two prism films 420 are used and micro prisms formed on each of the prism films 420 make a predetermined angle with each other. Most of the light passing through the prism film 420 continues vertically, thereby providing uniform brightness distribution. If necessary, a reflective polarizing film may be used along with the prism film 420, or only the reflective polarizing film may be used without the prism film 420.

The protection film 430 disposed at the top of the light control member 400 protects the prism film 420, which is vulnerable to scratching.

A reflecting plate 530 is disposed on a portion of an LED circuit 510 where the LED 520 is not mounted. An LED through hole is disposed in the reflecting plate 530 corresponding to the arrangement of the LED 520.

The LED 520, comprising a chip (not shown) to generate light, is configured with an elevation higher than the reflecting plate 530. The reflecting plate 530 reflects the light delivered downward and directs the reflected light to the diffusion plate 410. The reflecting plate 530 may comprise, e.g., polyethylene terephthalate (PET) or polycarbonate (PC), and/or be coated with silver (Ag) or aluminum (Al). In addition, the reflecting plate 530 is formed with a sufficient thickness so as to prevent distortion or shrinkage due to heat generated from the LED 520.

The LED 520 is mounted on the LED circuit board 510 and disposed across an entire rear surface of the LCD panel. The LED 520 comprises a red LED, a blue LED and a green LED, and provides each color of three lights sequentially to the LCD panel every frame.

The light source part 500 may be either a direct type such that the light source part is disposed in the rear of the LCD panel to provide light or an edge type such that the light source part is disposed at a lateral side of the LCD panel to provide light. The direct type light source is used in the exemplary embodiment.

Figure 3:
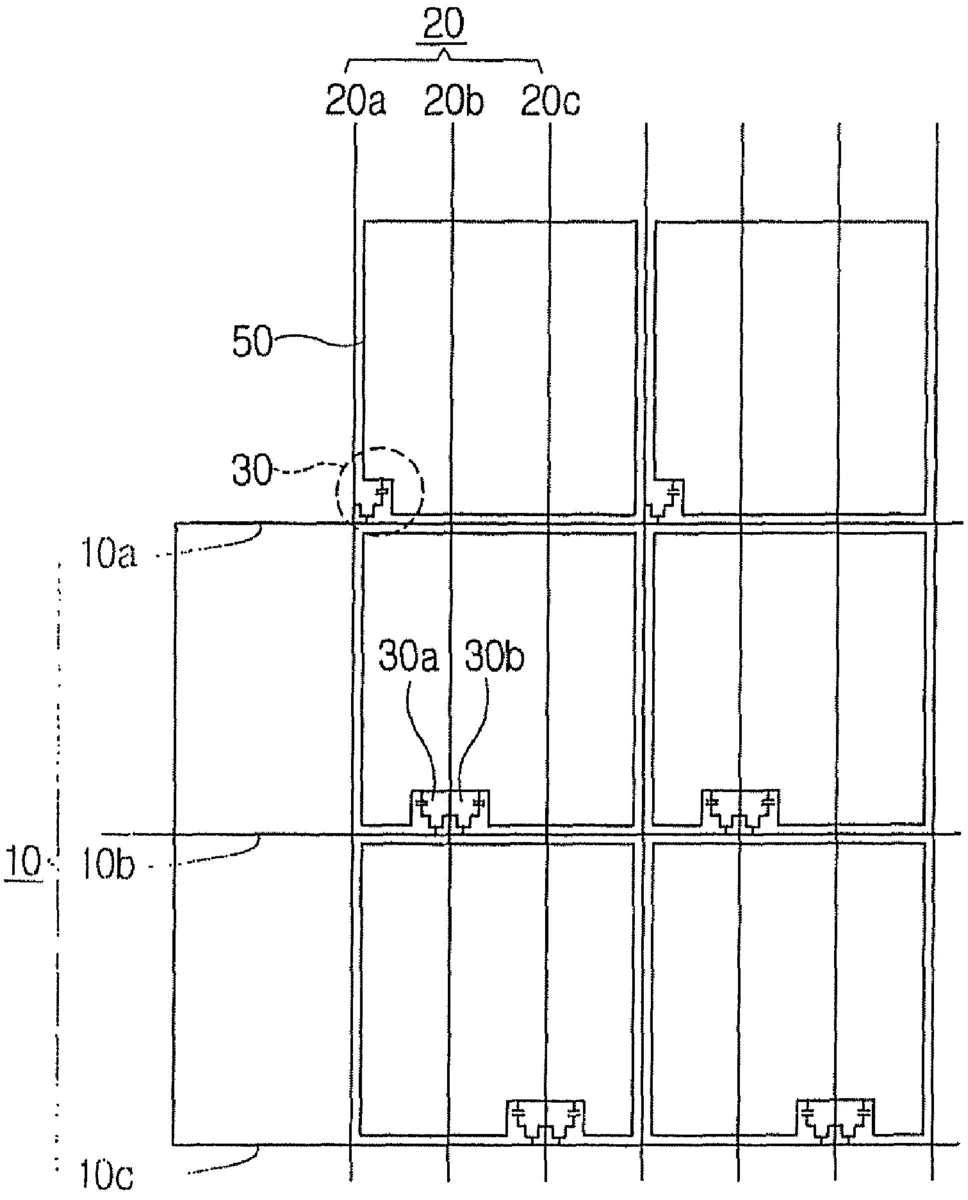
FIG. 3 is a plan view showing an arrangement of a plurality of pixels of a second exemplary embodiment of an LCD according to the present invention.

FIG. 3 is a drawing showing the pixel arrangement of a second exemplary embodiment of an LCD according to the present invention. The second exemplary embodiment of the LCD has the same configuration as the first exemplary embodiment of the LCD except for a TFT 30 disposed in the pixels 50.

In an FSC method LCD, a width/length ("W/L") ratio of a TFT has to be increased three times more than in the conventional LCD so as to improve a charging rate. However, a short-circuit may be caused between channels as a length of a channel lengthens, and Cgs may increase, thereby increasing a kick-back voltage. Accordingly, additional TFTs 30 are disposed with the data line 20 in parallel in the exemplary embodiment of FIG. 3. Therefore, the overall length of the channel lengthens, thereby enhancing the charging rate. Further, extra or redundant TFTs are provided, which may replace a corresponding defective one, thereby reducing defectiveness of the pixel 50.

As shown in FIG. 3, two TFTs 30*a*, 30*b* are connected to each of the data lines 20*b*, 20*c* passing through the pixel 50, respectively. The two TFTs 30*a*, 30*b* are applied with the same data signal to apply to one pixel 50, therefore the charging rate of the pixel 50 is more improved compared to a pixel 50 provided with a single TFT.

Figure 4A:
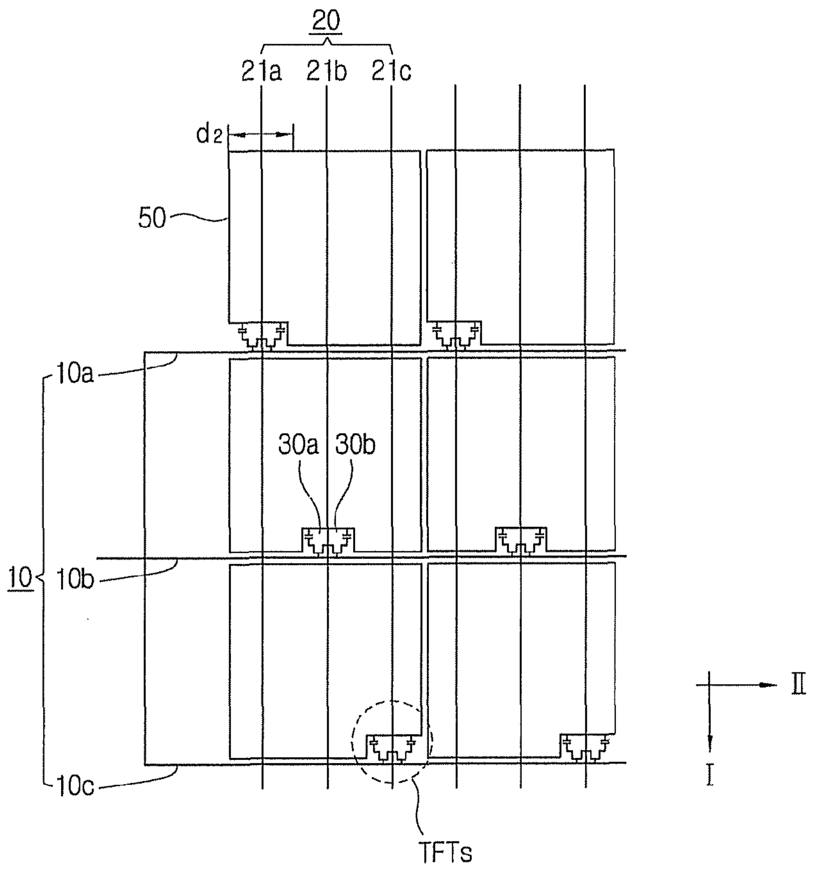
FIG. 4A is a plan view showing an arrangement of a plurality of pixels of a third exemplary embodiment of an LCD according to the present invention.

FIG. 4A is a drawing showing an arrangement of a plurality of pixels of a third exemplary embodiment of an LCD according to the present invention.

Unlike a second row of the pixel 50 and a third row of the pixel 50 illustrated in FIG. 3, which comprise two TFTs 30*a*, 30*b*, a first row of the pixel 50 connected to a data line 20*a* disposed outside one side of the pixel 50 cannot comprise two TFTs in the second exemplary embodiment. Thus, if each of the pixels 50 comprises different numbers of TFTs and thus the data signals are applied under different conditions, the charging rate may vary, thereby not displaying appropriate images. However, the third exemplary embodiment of FIG. 4A illustrates the pixel 50, which improves on this disadvantage noted with respect to the second exemplary embodiment of FIG. 3.

As shown in FIG. 4A, each pixel 50 comprises a gate line 10, three data lines 21*a*, 21*b*, 21*c* and two TFTs 30*a*, 30*b*. If one pixel 50 is divided into three areas, each corresponding data line 21*a*, 21*b*, 21*c* passes through the middle of each respective area. In other words, each of the data lines 21*a*, 21*b*, 21*c* is disposed in the middle of each area having a side length of d2, and two TFTs 30*a*, 30*b* are connected to each of the data lines 21*a*, 21*b*, 21*c* and disposed symmetrically across the data lines 21*a*, 21*b*, 21*c*. This not only solves the disadvantage that all of the pixels 50 do not comprise the same number of TFTs, but also improves the charging rate of the pixel 50 arranged in the first row.

The TFTs 30*a*, 30*b* connected to the third data line 21*c* will be described in detail with reference to FIGS. 4A and 4B. The two TFTs 30*a*, 30*b* have the same design and are disposed symmetrically across the data line 21*c*. The TFT 30 comprises a gate electrode 31, which is a portion of the gate line 10*c*, a drain electrode 33 branched from the data line 20*c* and having a "U" shape and a source electrode 35 separated from the drain electrode 33 to be connected to the pixel 50. A semiconductor layer 37 is formed on the gate electrode 31 and transmits a data signal from the drain electrode 33 to the source electrode 35 according to a gate signal applied to the gate electrode 31. The source electrode 35 is electrically and physically connected to the pixel 50 through a contact hole.

If a scanning direction I of an exposure machine used for forming the gate line 10 and the data line 20 is in a column direction, mis-alignment of the lines 10, 20 may be generated possibly in a row direction II normal or perpendicular to the scanning direction I. If positions of the drain electrode 33 and the source electrode 35 are changed due to the mis-alignment of the lines 10, 20, variation of Cgs between the TFTs 30*a*, 30*b* may vary. Thus, a plurality of TFTs 30 are provided in the row direction II to thereby make up for any variation of Cgs if mis-alignment of the lines 10, 20 is generated. Accordingly, it is preferable that a channel having a "U" shape is formed in the row or horizontal direction II substantially normal to the scanning direction I of the exposure machine so as to make up for the variation of Cgs due to the mis-alignment of the lines.

Figure 5:
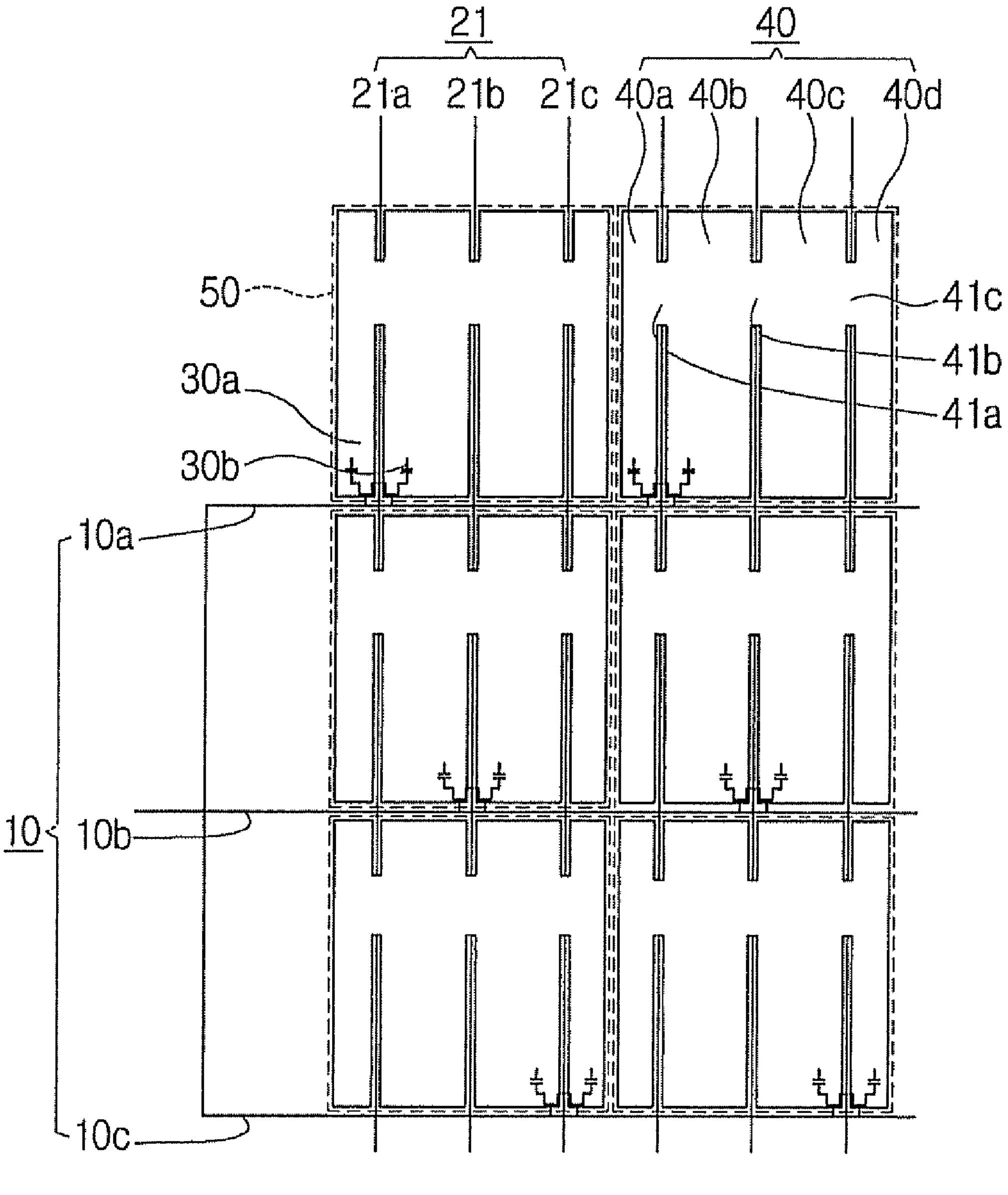
FIG. 5 is a plan view showing an arrangement of a plurality of pixels of a fourth exemplary embodiment of an LCD according to the present invention.

FIG. 5 is a drawing showing an exemplary embodiment of a pixel according to the present invention. Unlike the pixel 50 described before, a pixel electrode 40 is not the same as a pixel 50 in the previous described exemplary embodiment. The pixel electrode 40 is comprised of the pixel 50 and is divided into four areas 40*a*, 40*b*, 40*c*, 40*d* by a data line 21. The data lines 21*a*, 21*b*, 21*c* partly overlap the pixel electrode 40 and bridge electrodes 41*a*, 41*b*, 41*c* are formed between the pixel electrodes 40*a*, 40*b*, 40*c*, 40*d*.

The bridge electrodes 41*a*, 41*b*, 41*c* are formed of the same transparent electrode as the pixel electrode 40 and may be disposed on one data line 21 in plural.

Except for the bridge electrodes 41*a*, 41*b*, 41*c* on the data lines 21*a*, 21*b*, 21*c*, the bridge electrodes 41*a*, 41*b*, 41*c* are not formed on the pixel electrode 40, thereby reducing load generated in the data lines 21*a*, 21*b*, 21*c*. If the load generated in the data line 21 is reduced, an aperture ratio is decreased, yet the charging rate is increased due to the decrease of Cgs.

In another exemplary embodiment, the data line 21 connected to the pixel 50, e.g., a first data line 21*a* connected to the first pixel 50 may not overlap the pixel electrode 40. This means that the bridge electrode 41*a* may not be formed on the data line 21*a* to connect the two pixel electrodes 40*a*, 40*b*, because the data signal may be applied by the TFTs 30*a*, 30*b* connected to the data line 21*a* although the pixel electrodes 40*a*, 40*b* are not connected.

Figure 6A:
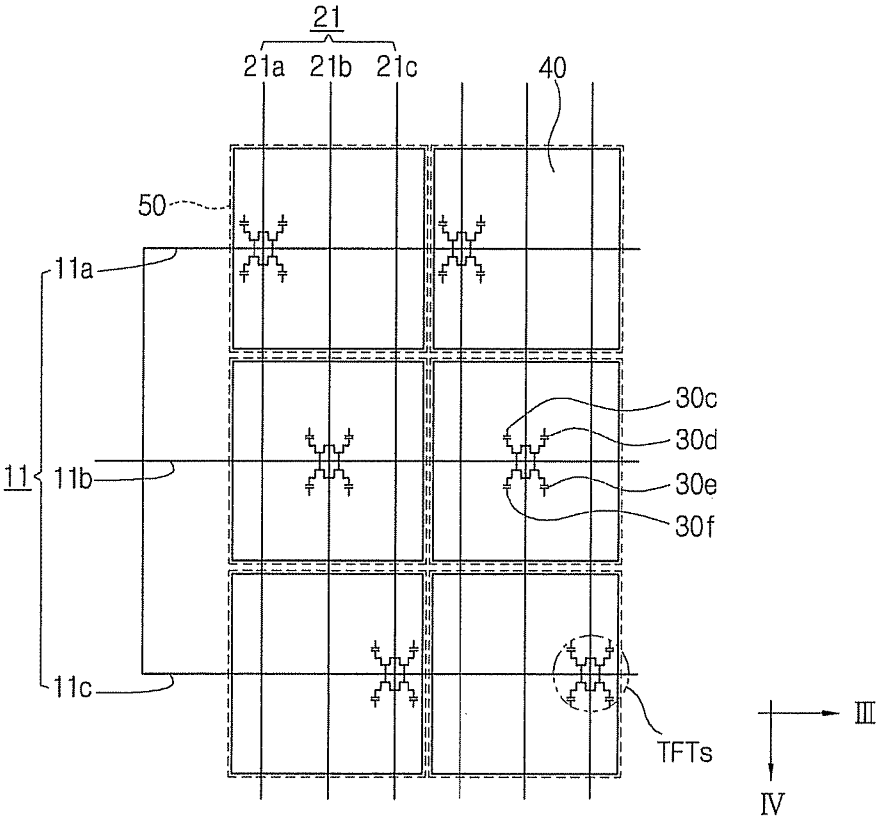
FIG. 6A is a plan view showing an arrangement of a plurality of pixels of a fifth exemplary embodiment of an LCD according to the present invention.

FIG. 6A is a drawing showing an exemplary embodiment of a pixel according to the present invention. As shown in FIG. 6A, a gate line 11 passes through a pixel 50 and four TFTs 30*c*, 30*d*, 30*e*, 30*f* that are disposed in one pixel 50. The TFTs 30*c*, 30*d*, 30*e*, 30*f* are disposed symmetrically across a gate line 11 and a data line 21. As the number of TFTs increases, the length of all channels becomes longer, thereby improving a charging rate.

Figure 4B:
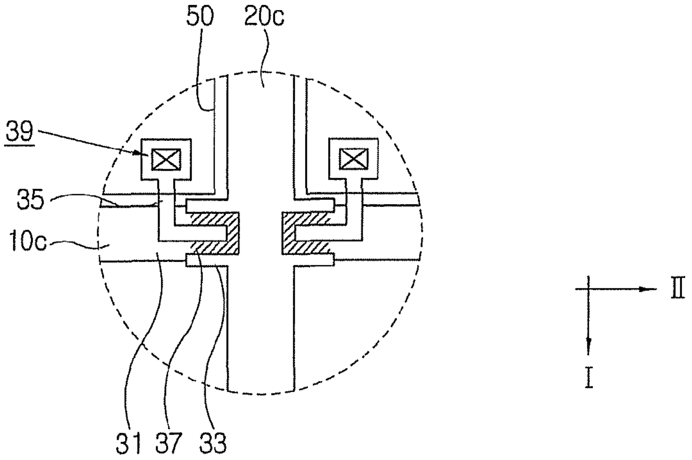
FIG. 4B is an enlarged partial plan view showing an arrangement of two TFTs connected to a third data line of single pixel in accordance with the third exemplary embodiment of an LCD according to the present invention.
Figure 6B:
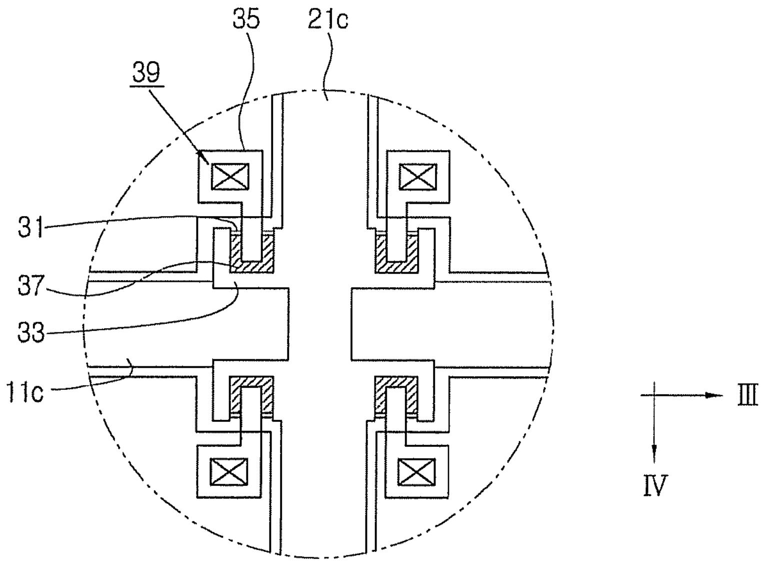
FIG. 6B is an enlarged partial plan view showing an arrangement of two TFTs connected to a third data line of single pixel in accordance with the fifth exemplary embodiment of an LCD according to the present invention.

Referring to FIG. 6B showing the enlarged TFT 30 connected to data line 21*c*, the channel of the exemplary embodiment is formed in a different shape from that of the third embodiment shown in FIGS. 4A and 4B. The channel of the exemplary embodiment has a "U" shape, which is parallel with the column direction contrary to that illustrated in the third embodiment of FIGS. 4A and 4B. If a scanning direction III of an exposure machine is parallel with the row direction, mis-alignment of lines may be generated in a direction IV corresponding to the column direction. Accordingly, the "U" shape of the channel of the TFT 30 is preferably disposed in the column direction IV normal to the scanning direction III of the exposure machine to make up the variation of Cgs.

The "U" shape of the channel is not limited to a certain direction in disposition mentioned in the exemplary embodiments, but it may be disposed in various other directions depending on the scanning direction of the exposure machine.

Figure 7:
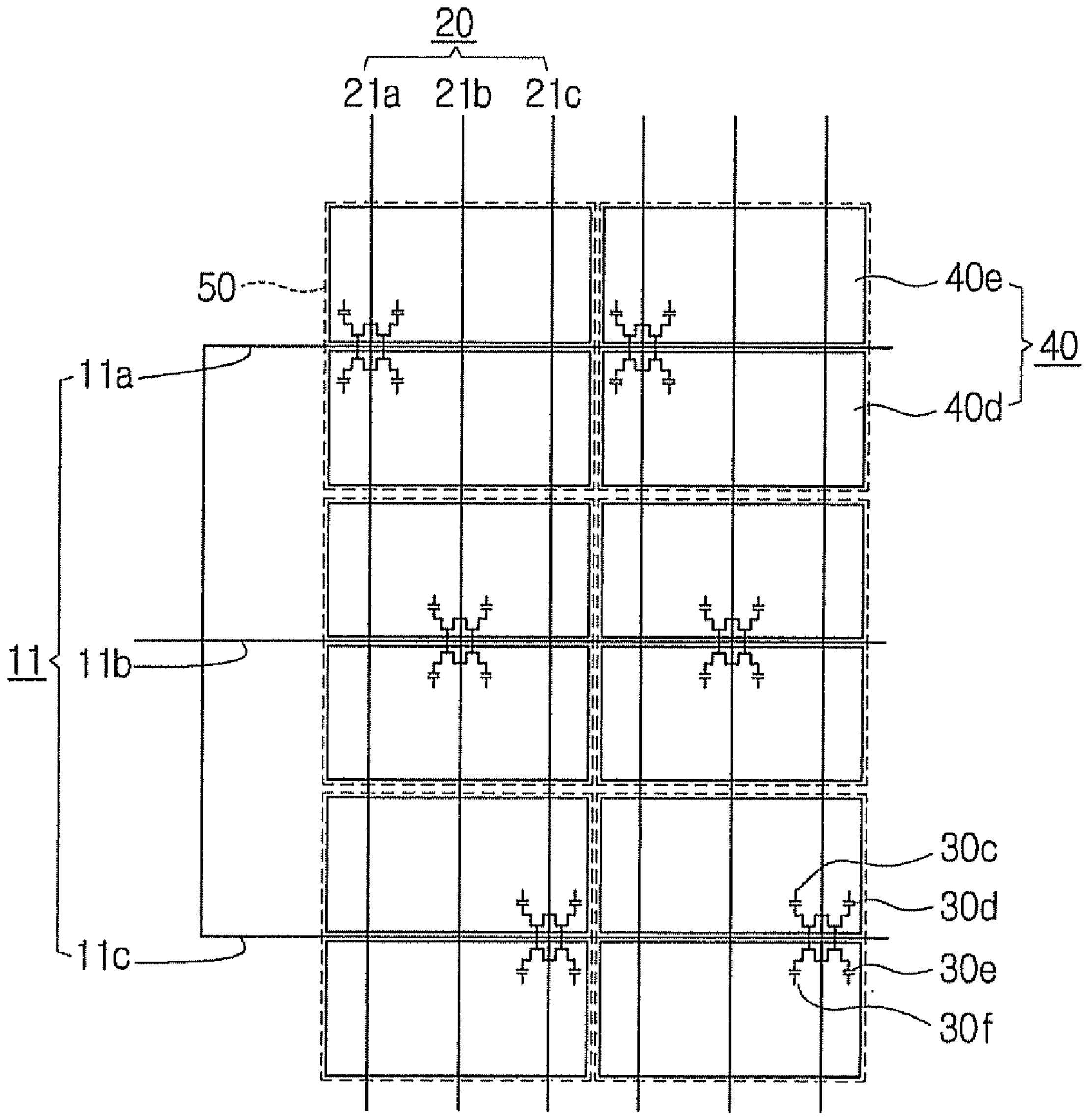
FIG. 7 is a plan view showing an arrangement of a plurality of pixels of a sixth exemplary embodiment of an LCD according to the present invention.

FIG. 7 is a drawing showing an exemplary embodiment of a pixel according to the present invention. Unlike the gate line 11 in FIG. 6, a gate line 11 does not overlap a pixel electrode 40.

The pixel electrode 40 is divided into two pixel electrodes 40*d*, 40*e*. Each of the two pixel electrodes 40*d*, 40*e* is applied with a data signal from each pair of two pairs of TFTs 30*c*, 30*d* and 30*e*, 30*f*. The pixel electrode 40 is formed separately from the gate line 11, thereby reducing a load generated in the gate line 11. If the load generated in the gate line 11 is reduced, the aperture ratio is decreased, yet the charging rate is increased due to the decreases of Cgs. Thus, metal layers are arranged separately from each other, thereby reducing cross-talk.

The pixel 50 is applied with the same data signal by each pair of the pairs of TFTs 30*c*, 30*d* and 30*e*, 30*d* respectively connected to each of the pixel electrodes 40*d*, 40*e*. Therefore, there is no problem to drive the pixel 50 even if the pixel electrodes 40*d*, 40*e* are completely separated from each other.

According to another exemplary embodiment, the pixel electrodes 40*d*, 40*e* separated from each other across the gate line 11 may be partly connected to the gate line 11. The pixel electrodes 40*d*, 40*e* may be connected to each other through a bridge electrode or the like, thereby increasing an area of the pixel electrode 40 to improve the aperture ratio.

Figure 8:
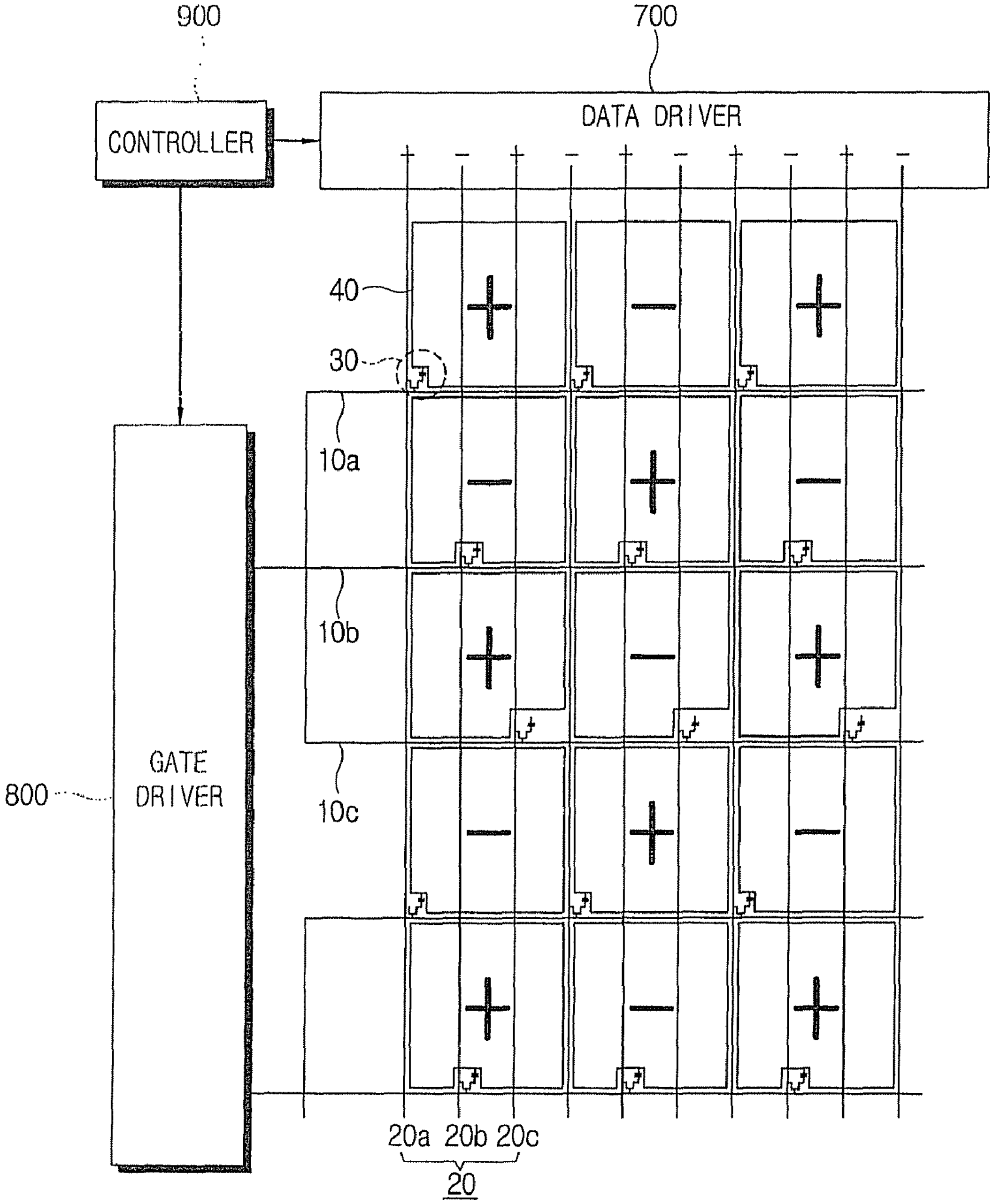
FIG. 8 is a drawing illustrating how to drive the first exemplary embodiment of the LCD of FIGS. 1 and 2 according to the present invention.

FIG. 8 is a drawing to illustrate how to drive the LCD of the first exemplary embodiment according to the present invention. As shown in FIG. 8, the LCD further comprises a gate driver 800, a data driver 700 and a controller 900 in addition to a gate line 10 and a data line 20.

The gate driver 800 applies control signals to drive the gate line 10. The gate driver 800 is synchronized with a start signal (STV) and a gate clock (CPV) from the controller 900, thereby applying a gate on voltage to each gate line 10.

The data driver 700 is synchronized with a clock (HCLK), thereby converting image data signals into corresponding gray scale voltages, then outputting appropriate data signals to each data line 20 according to load signals outputted from the controller 900.

The LCD adopts an inversion driving method, which changes polarity of data signals applied to the pixel 40 by frames. Generally, dot inversion is frequently used since frame inversion or line inversion generates image flickers. The frame inversion changes polarity of data signals by frames, the line inversion changes polarity of data signals by gate lines, and the dot inversion allows adjacent pixels to have different polarities.

As shown in FIG. 8, the data driver 700 changes polarity of data signals every data line 20. The adjacent data lines 20*a*, 20*b*, 20*c* disposed in a row direction are applied with different polarities of data signals from one another. Polarities of these data lines 20*a*, 20*b*, 20*c* are alternated every frame, and polarities of each pixel 40 vary as the frames are alternated. Consequently, the data driver 700 applies the different polarities of data signals to data line 20 line by line, yet it appears that the LCD adopts the dot inversion. Therefore, the image flickers generated in the line inversion may be solved.

The controller 900 outputs different control signals to drive the gate line 10 and the data line 20, and controls the data driver 700 to apply the different polarities of data signals to every data line 20. The dot inversion is determined according to how the pixel 40 is connected to the data line 20 and the polarity of data signals applied to the data line 20, and is used by various combinations. The controller 900 outputs the different polarities of data signals so that the TFT 30 and the data line 20 are connected to complete line assembly of a TFT substrate, and the data driver 700 is controlled to be driven by the dot inversion.

Figure 9:
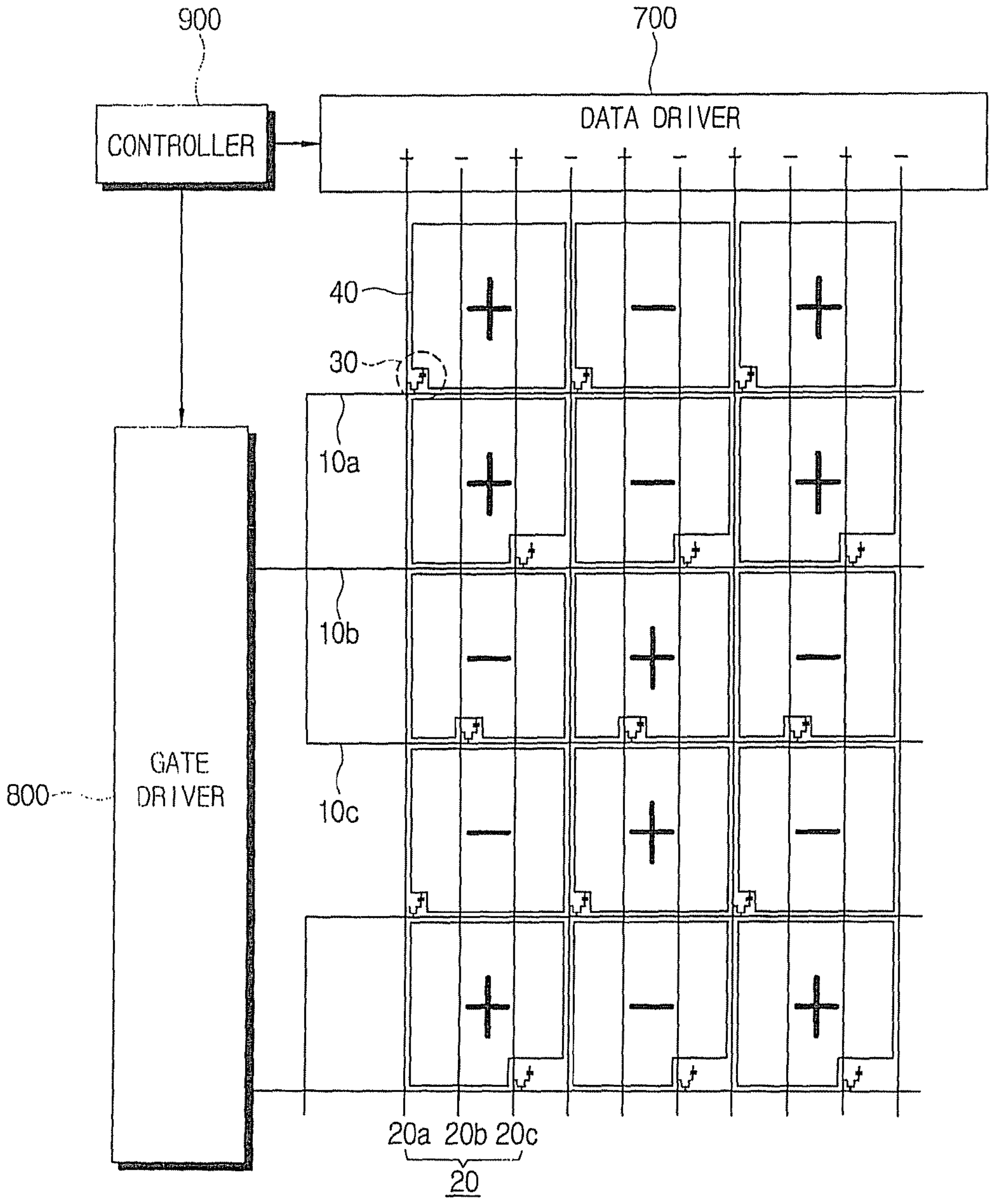
FIG. 9 is a drawing illustrating how to drive a seventh exemplary embodiment of an LCD according to the present invention.

FIG. 9 is a drawing to illustrate how to drive a seventh exemplary embodiment of an LCD according to the present invention. A pixel 40 of the exemplary embodiment is arranged differently from the one shown in FIG. 8. In other words, a position of a TFT 30 connected to a data line 20 is changed.

Provided that a plurality of data lines 20*a*, 20*b*, 20*c* disposed in one pixel 40 are expressed as a first data line 20*a*, a second data line 20*b*, and a third data line 20*c* in order, adjacent pixels 40 in a column direction are sequentially connected to the first data line 20*a*, the third data line 20*c*, and the second data line 20*c*. The TFTs 30 arranged in the aforementioned are applied with one gate signal.

A data driver 700 applies different polarities of data signals to the adjacent data lines 20*a*, 20*b*, 20*c* in a row direction. The seventh exemplary embodiment of FIG. 9 applies signals with the same method as the first exemplary embodiment, yet the pixels 40 do not operate with 1-dot inversion as in the first exemplary embodiment, but with 2-dot inversion that the adjacent two pixels 40 in a column direction have the same polarities.

As described before, the polarity of the pixel 40 may vary depending on the arrangement of the TFTs 30. The data driver 700 drives the data line 20 with the line inversion, yet it appears to operate with the dot-inversion.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:

a plurality of pixels arranged in a matrix array;

a plurality of gate lines applying the same gate signal to at least two rows of the pixels; a data line crossing the gate lines;

a thin film transistor disposed at an intersection of one of the gate lines and one of the data line;

a pixel electrode connected to the thin film transistor; and a light source part sequentially providing at least two colors of light to the pixels every frame, wherein the data line partially overlaps the pixel electrode, and wherein the pixel further comprises at least one or more bridge electrodes, the bridge electrodes connect the pixel electrodes which are separated from each other across the data line.

2. The display apparatus according to claim 1, wherein the plurality of gate lines applying the same gate signal to the pixels are connected to one another.

3. The display apparatus according to claim 1, wherein three rows of the pixels are applied with the same gate signal.

4. The display apparatus according to claim 1, wherein a plurality of data lines are provided in one pixel.

5. The display apparatus according to claim 4, wherein the number of the data lines in one pixel is the number of the pixels applied with the same gate signal.

6. The display apparatus according to claim 4, wherein at least one of the adjacent pixels in a column direction applied with the same gate signal is connected to a different data line from the others.

7. The display apparatus according to claim 4, wherein the adjacent pixels in a column direction applied with the same gate signal are connected to different data lines from one another.

8. The display apparatus according to claim 1, wherein at least a portion of each pixel comprises a plurality of TFTs.

9. The display apparatus according to claim 8, wherein the TFTs are connected to the same data lines.

10. The display apparatus according to claim 8, wherein the TFT is provided in two.

11. The display apparatus according to claim 10, wherein the TFTs are disposed symmetrically across the data line.

12. The display apparatus according to claim 8, wherein the TFTs are disposed symmetrically across the data line.

13. The display apparatus according to claim 1, wherein each of the pixels comprises a pixel electrode and the data line passing through the pixel.

14. The display apparatus according to claim 13, wherein the data line connected to one pixel does not overlap the pixel electrode.

15. The display apparatus according to claim 14, wherein the pixel further comprises at least one or more bridge electrodes, the bridge electrodes connect the pixel electrodes which are separated from each other across the data line.

16. The display apparatus according to claim 1, wherein the pixel further comprises at least one or more bridge electrodes, the bridge electrodes connect the pixel electrodes which are separated from each other across the data line.

17. The display apparatus according to claim 1, wherein the pixel comprises a pixel electrode and the gate line passes through the pixel.

18. The display apparatus according to claim 17, wherein the pixel comprises four TFTs.

19. The display apparatus according to claim 18, wherein the TFTs are disposed symmetrically across one of the gate lines and the data line.

20. The display apparatus according to claim 17, wherein the one of the gate lines partly overlaps the pixel electrode.

21. The display apparatus according to claim 17, wherein the one of the gates line does not overlap the pixel electrode.

22. The display apparatus according to claim 21, wherein each of the pixels further comprises at least one or more bridge electrodes to connect the pixel electrodes which are separated from each other across the gate line.

23. The display apparatus according to claim 20, wherein each of the pixels further comprises at least one or more bridge electrodes to connect the pixel electrodes which are separated from each other across the gate line.

24. The display apparatus according to claim 1, further comprising an organic layer formed between the data line and the pixel.

25. The display apparatus according to claim 1, wherein the light is three-color light and the three colors comprise red, green and blue.

26. The display apparatus according to claim 4, wherein a first, a second and a third data lines are sequentially provided in one pixel in a row direction, and the adjacent pixels in a column direction are sequentially connected to the first, the second and the third data lines.

27. The display apparatus according to claim 26, further comprising a data driver applying a data signal to the data line and a controller controlling the data driver, wherein the controller controls the data driver so that different polarities of the data signals are applied to the adjacent data lines in a row direction.

28. The display apparatus according to claim 4, wherein a first data line, a second data line and a third data line are sequentially provided in one pixel in a row direction, and the adjacent pixels in a column direction are sequentially connected to the first, the third and the second data lines.

29. The display apparatus according to claim 28, further comprising a data driver applying a data signal to the data line and a controller controlling the data driver, wherein the controller controls the data driver so that different polarities of the data signals are applied to the adjacent data lines in a row direction.

* * * * *